Oct. 14, 1969  D. L. JOHNSON  3,472,296
PROCESS AND APPARATUS FOR PRIMARY BREAKDOWN OF ROUNDWOOD
Filed April 12, 1967  5 Sheets-Sheet 1

Fig. 1.

INVENTOR.
DONALD L. JOHNSON
BY
ATTORNEYS

Oct. 14, 1969     D. L. JOHNSON     3,472,296

PROCESS AND APPARATUS FOR PRIMARY BREAKDOWN OF ROUNDWOOD

Filed April 12, 1967     5 Sheets-Sheet 2

PRIMARY BREAKDOWN OF TREE LENGTH, MAXIMUM TRUCK LENGTH AND OTHER ROUNDWOOD OF LARGER DIAMETER TO WOOD FLAKES, TIMBERS AND LUMBER.

| STATION B. | PRIMARY PRODUCTS | PROCESS STEPS |
|---|---|---|
|  | → PARTING MATERIAL | (a) PARTING FROM FLACED SIDE OF A LARGER LOG OF FLAT GRAIN CANTS AND BOARDS TO THICKNESS AND ANY VERTICAL GRAIN CANTS TO WIDTH; |
| | | (b) TURNING TO ANOTHER OF THE RECTANGULAR SIDES AND REPETITION OF (a). |

*Fig. 2.*

PRIMARY BREAKDOWN OF TREE LENGTH, MAXIMUM TRUCK LENGTH AND OTHER ADEQUATE ROUNDWOOD TO WOOD FLAKES, LONG TIMBERS AND LUMBER OF PROGRAMMED LENGTH.

| STATION A. B. | PRIMARY PRODUCT | PROCESS STEPS |
|---|---|---|
|  | → CUTOFF MATERIAL | (a) CUTOFF OF ANY LONG TIMBER ROUNDWOOD TO LONG TIMBER LOG LENGTH; |
|  | → TRIM MATERIAL | (b) TRIMMING TO THE PARTING LINE OF ANY CLEAR AND COMMON LUMBER PORTION TO PROGRAMMED LUMBER LENGTH; |
|  | → PARTING MATERIAL | (c) PARTING OF LUMBER PORTION FROM THE PARENT LOG; |
|  | → FLAKES | (d) FLACING OF ANY RESIDUAL ALONG PARTING LINE TO DESIRED FLAKES; |
|  | → PARTING MATERIAL → FLAKES | (e) TURNING OF LOG TO ANOTHER OF RECTANGULAR SIDES AND REPETITION OF (b), (c) AND (d); |
|  | → FLAKES | (f) FLACING OF ANY TAPERED AND OFFSIZE RESIDUAL PRODUCING FLAKES AND A LONG RECTANGULAR TIMBER; |
|  | → LONG LUMBER OR TIMBERS | (g) PARTING, IF DESIRED, OF LONG RECTANGULAR TIMBER TO LONG FRAMING LUMBER |
| | | (h) DISTRIBUTION OF LONG RECTANGULAR PRODUCT TO PRODUCT LINE. |

*Fig. 3.*

INVENTOR.
DONALD L. JOHNSON

BY
ATTORNEYS

PRIMARY BREAKDOWN OF TREE LENGTH, MAXIMUM TRUCK LENGTH AND OTHER ROUNDWOOD TO WOOD FLAKES, TIMBERS, ANY CLEAR AND SHOP LUMBER OF PROGRAMMED LENGTH.

Fig. 4.

PRIMARY BREAKDOWN OF TREE LENGTH, MAXIMUM TRUCK LENGTH AND OTHER ROUNDWOOD TO WOOD FLAKES AND SELECTIVELY TO LUMBER OF PROGRAMMED THICKNESS AND LENGTH.

Fig. 5.

INVENTOR.
DONALD L. JOHNSON
BY
ATTORNEYS

Oct. 14, 1969  D. L. JOHNSON  3,472,296
PROCESS AND APPARATUS FOR PRIMARY BREAKDOWN OF ROUNDWOOD
Filed April 12, 1967  5 Sheets-Sheet 4

INVENTOR
DONALD L. JOHNSON
BY
ATTORNEYS

United States Patent Office 3,472,296
Patented Oct. 14, 1969

3,472,296
PROCESS AND APPARATUS FOR PRIMARY BREAKDOWN OF ROUNDWOOD
Donald L. Johnson, 1340 Heatherwood W., Tacoma, Wash. 98406
Continuation-in-part of application Ser. No. 456,624, May 18, 1965. This application Apr. 12, 1967, Ser. No. 635,639
Int. Cl. B27c 9/00, 1/14
U.S. Cl. 144—326          20 Claims

ABSTRACT OF THE DISCLOSURE

Process and apparatus for the step by step reduction of generally 8 inch diameter and larger roundwood to bark, wood flakes and selected programmed size of rectangular lumber products together with mass produced apparatus for reduction of 4 to 8 inch thinnings and the like to desired wood flakes. Roundwood is delivered in tree length or maximum practicable lengths to the flacer mill preferably located within a sustained yield tree farm area. Flaking and surfacing (flacer) heads replace saws for all outside cuts on logs, cants and boards in the new flacer mill. New thin flakes are produced for flacer plywood and new chemical processing or thick flakes compatible with conventional chips are produced as the dominant product with selected rectangular timbers and lumber as the recessive or residuals of flake production. Sorting of roundwood for size and quality and of rectangular lumber product is largely eliminated.

CROSS REFERENCES TO RELATED APPLICATIONS

This is a continuation-in-part of my pending application entitled, Process and Apparatus for reduction of logs to Flakes and Lumber, Ser. No. 456,624; filed May 18, 1965 and now abandoned.

This application is related to my companion application entitled, Method and Means for Improved Production of Wood Flakes, filed Apr. 12, 1967, Ser. No. 630,396 and a continuation-in-part of my pending application entitled, Cutterhead Assembly for Thin Wood Flakes, Ser. No. 456,625; filed May 18, 1965 now abandoned.

BACKGROUND OF THE INVENTION

Field of the invention

This invention relates to process and apparatus for the primary breakdown of tree length, maximum truck length and other roundwood to bark, wood flakes (either thin flakes under about $\frac{1}{20}$ inch in thickness or thick flakes compatible with conventional chips generally over $\frac{1}{20}$ inch in thickness) and selectively to wood flakes, to long timbers if desired, short timbers, any clear lumber, factory or shop and programmed sizes of common lumber as residuals of flake production employing any cutterhead of my earlier inventions now issued Patents 2,889,-859; 2,949,946; 2,969,079; 3,240,245; 3,245,442; 3,262,-476 and, in particular, the cutterhead assembly of my abovementioned companion application or any other cutterhead assembly capable of combined cutting of flakes or chips and surfaces.

The above issued patents and my companion application, Method and Means for Improved Production of Wood Flakes, are concerned primarily with the cutting of flakes and an optional flat surface from and upon the side of a log, cant or board; and operation for which applicant has coined the word "flace," i.e., a combination of "flake" and "face," meaning the simultaneous flaking and facing performed by any cutterhead assembly of these inventions and referred to hereinafter as the operation of "flacing" or to "flace" and the machine as a "flacer."

Stated more simply, the present process and apparatus invention pertains to a new standardized and universally useful primary log breakdown mill for the wood industry. Since this new mill is based primarily upon employment of the flacer, it will be referred to hereinafter as a "flacer mill."

While it is an objective of the present invention to provide process and apparatus primarily for employment of the flacer of my companion application, other cutterheads might also be employed—although less advantageously—in the present process invention particularly for chips. Any cutterhead capable of performing the combined cutting of flakes or chips and surfaces while moving the wood in a longitudinal direction may be used in the present process and apparatus invention.

Problems of the flacer

The method and means of my earlier inventions and issued patents have been used in certain isolated instances for the cutting of thick flakes from oversize lumber, in laboratory trials and in certain cutterheads in pairs as a whole log chipper and canting machine, but no satisfactory process and apparatus employing the flacer in the primary breakdown of roundwood, to applicant's knowledge, has been known or understood heretofore.

The flacer has capability and limitations which must be recognized in its application to primary breakdown of roundwood.

In orthogonal cutting of veneer and the like, the cutting edge is parallel with the fiber of the wood, moves in one plane and perpendicular to the fiber. In a veneer lathe, the knife edge is parallel with the axis of rotation. Except for taper and other variations, cutting is parallel with the fiber. However, since the veneer knife cuts spiral or cupped veneer, lathe cutting is not true orthogonal cutting.

In a veneer slicer, true orthogonal cutting could be carried out, but is never used in practise. It is better to have the cutting edge somewhat off-parallel together with some motion along the cutting edge. A veneer slicer usually operates with the wood moving longitudinally along the blade as well as transversely and always somewhat off-parallel.

In a flacer this most advantageous slicing of flakes (veneer) occurs since motion of the cutting edge is in one plane, across the wood grain, generally off-parallel and accompanied by longitudinal feeding of the wood. The only problem is to limit the deviation from parallel (the width of face to be flaced) so that it is not too large.

In the cutting of flakes, as each flake is cut and broken from the parent wood, it leaves a flat spiral-ended surface which becomes the face of the next flake or the surface on the side of the log or cant. Provided the wood is adequately supported and free of vibration during flacing, then quality flakes are cut and a quality surface is produced.

The movement of the wood must be controlled and the wood supported during flacing for the production of quality flakes and surfaces. Any undesired movement or vibration interferes with the cutting of quality flakes and surfaces.

Knots, decay and other defects in logs must be considered such that knots are cut generally across the axis of the knot and loose and decayed particles do not contaminate the flake supply.

Capability is needed to process the full range of log sizes and quality to eliminate dividing the tree between mills, sorting of logs for size and quality and to provide an outlet for thinnings, culls, dead trees and quality roundwood of larger size all in the same primary mill.

All sawdust from outside cuts, the slabs, edgings, thins, trims, waste veneer, cores and the like must be eliminated by reducing this material to desired flakes in the first instance.

The flacer with its driving motor and flake collector is necesarily a heavy and substantial object weighing in nearest round figures about two tons. It is necessary to be able to introduce it and remove it from the flacing area and do this quickly, accurately and at low cost.

Capability is needed to reduce an entire log to desired flakes or to select out and distribute long timbers, short timbers, clears, shop or factory and common lumber from adequate roundwood.

A process and apparatus is needed employing flaking or chipping and surfacing heads; a process and apparatus which is universally useful, standardized in a few sizes and mass produced for quality, interchangeability of parts and low cost.

SUMMARY OF THE INVENTION

Process steps and a new flacer mill are provided for the primary breakdown of thinnings, generally 4 to 8 inches in diameter, to bark and wood flakes and for the reduction of generally 8 inch diameter and larger roundwood to bark and wood flakes and selectively to wood flakes and programmed lengths of rectangular lumber products.

Small thinnings and the like are delivered to one incoming log deck usually on light duty trucks while 8 inch and larger roundwood is delivered by heavier equipment to another incoming roundwood deck.

Prospective lumber containing roundwood is cutoff to programmed lumber length, debarked and delivered to the first flacer station. Logs generally from 8 to 16 inches in diameter is reduced to wood flakes or selectively to wood flakes and rectangular lumber products.

With the above as a nucleus, capability is added in process steps and parting means for breakdown of larger diameter roundwood to lumber; in log cutoff, debarking, trim and distribution means for breakdown of long timber roundwood to long timber length, to lumber of programmed length and to long timbers; for parting of clear cants and wide boards to lumber, distribution of clear lumber and short timbers to a product line; and for programmed parting of timbers flaced from selected cants to common lumber together with flacing selectively to width.

The yield in rectangular lumber products, because of log taper, is greater when short logs are processed. The cutoff of long lumber containing roundwood to a programmed log length simplifies debarking, eliminates trimming and also the sorting of lumber for length since only one length of lumber is produced at one time.

Efficient dry debarking is one of the first steps in the primary breakdown of roundwood. Many types and varieties of debarkers are now commercially available. Common log handling steps and costly equipment are involved together with quality of the primary products. Some debarkers have limitations in log diameter, others in length of logs. Logs free of bark first of all and bark free of wood as a secondary consideration are desired.

There are two main types of debarkers, i.e., the rotating ring and the rotating log debarkers. Rotating ring debarkers are very good for small roundwood, but are always limited in log diameter. A large ring barker is costly and not very good for small logs. A rotating log debarker using overlog rosser or abrading heads is not limited in log diameter, offers operator inspection and rerun if needed and lends itself to programmed sequence operation on uniform length logs. While not particularly high output per hour, it is adequate or balanced with the production rate of the larger log portion of a flacer mill.

While other debarkers may be used, the rotating ring debarker with a roll feed is preferred for the 4 to 8 inch thinnings and the like and the rotating log debarker is preferred for roundwood over 8 inches in diameter.

For logs over 8 inches in diameter a log carriage in combination with a flacer provides support for the round log and flexibility in allowance for diameter, knots, taper, sweep, decay and other defects. A vertical positioner for the flacer drive provides flexibility in position of the flacer for variations in log diameter.

A horizontal positioner could also be used. However, a vertical positioner is needed in any case to provide for variations in log diameter. A quick and accurate horizontal positioner for a mass of two tons is complex, costly and imparts a heavy horizontal reaction to the superstructure of a mill. Any error in position of from vibration is reflected in the product.

A flacer could cut its way into or out of a vertical position (with the axis of rotation horizontal), but not a horizontal position. A vertical positioner needs to be fast, but not particularly accurate in vertical position. A variation of an inch or so one way or another is not usually important. Reactions from quick movements of the flacer and drive would go vertically to the foundation. A vertical positioner can be used to introduce a flacer to or remove it from a flacing area. It can also be used to expose the face of the flacer for exchange of cutterheads. A single vertical positioner could be standardized and mass produced for quality, interchangeability of parts and low cost.

It is an object of the present invention to provide process steps and a log carriage and flacer for the flacing of a larger log providing a flat face for feeding for subsequent reduction to flakes or as a face or side for a rectangular timber or lumber.

Another object is to provide process steps employing a vertical positioning means for introduction to and removal of the flacer from the flacing area and for exchange of cutterheads.

An adjustment for flacer face angle position is provided between the flacer drive motor and the vertical positioner preferably rotatable on an axis behind or opposite the flacing area such that a change in face clearance angle does not change the face position.

Another adjustment is provided between the flacer motor drive and the vertical positioner in a horizontal slide for adjustment of face position of the flacer.

In the primary breakdown of roundwood from a tree farm, there are times when many small 8 to 16 inch logs must be processed. These can best be flaced on two adjoining sides, on a third side or squared by means of a log carriage and flacer combination and at rates such that it will be necessary to have two such units available. These steps can best be performed by a second log carriage and flacer of the present invention.

After flacing three sides of a log or cant, it may be desired to flace the fourth side to a rectangular timber or it may be discovered that the piece is defective as lumber and that it is best to reduce the entire piece to flakes.

Another object is to provide process steps and apparatus providing feeding surfaces on the logs, feeding means and a succession of flacers vertically introduceable to and removable from the flacing area for selective flacing of a cant to width or for reduction to desired flakes.

The above outlines the basic flacer mill comprising small 4 to 8 inch diameter log debarking and flaking station designated as station AA; an 8 inch and larger mill comprising a roundwood cutoff and debarking station, a log flacing station, a second log flacing station and a final successive flacing and flaking station each designated as stations A, B. C and D. Each of the stations is under control of operators AA, A, B, C and D respectively.

The two lines can be operated simultaneously or independently dependent upon the wood supply and other factors and providing two independent sources for the desired steady production of the wood flakes.

The process steps of the present invention apply to the 8 inch and larger roundwood stations A, B, C and D where flakes are the dominant product with rectangular timbers and lumber the recessive or residuals of flake production.

For the breakdown of larger diameter logs to cants and boards a parting means is added after the flacer of station D with the parting line in the flacing area and on the face line of the flacer.

In a combination of a log carriage, flacer with vertical positioner and parting means, it is necessary to provide a carriage drive capable of programming the feed rate to the flacer. A saw or other parting means also has an optimum feed rate for a given depth of cut, quality of surface and other factors. The sawyer does the same work he did heretofore, but uses the flacer instead of the saw for all outside cuts reducing formerly waste material to desired flakes in the first instance. Since he no longer does destructive work, he has eliminated the labor and equipment formerly required to dispose of the waste. He can "afford" to work more carefully, at a slower and more sensible rate. Also, a programmed feed to the saw or other parting means is available to him for the inside or parting cuts which means he can use a thinner saw, requiring less power, producing less deflection, taking less kerf, cutting a smoother face and increasing the accuracy and yield of lumber.

The flacer may now be used for all outside cuts on a log, cant or board and a parting means may be used for all inside cuts in the breaking down of logs or low grade portions of a log may now be selectively reduced to desired flakes.

When long timbers or long framing lumber is to be cut from long timbers, it is necessary to provide for trimming of long boards from the outside of the log to programmed lumber length. A trimmer is costly, requires much space and at least one extra man. It would be needed only occasionally. Once a fishtailed end has been parted and trimmed it cannot be supported to be reduced to desired flakes. Sawdust is also produced in parting it from the parent log.

The carriage and log, after flacing of one side, can now be accurately positioned in front of the parting means with respect to the end of the log and a fixed log end line. Photoelectric cells or other means may be used to position the end of the log through controls of the carriage drive. A trim means can be installed adjustable in position with respect to the fixed log end line such that lumber portions set out by the carriage knees can be trimmed to programmed lumber length prior to parting off of the board or cant. The log would be set out the desired amount, the trim cut made followed by parting of the cant or board. The remainder would then be reduced to flakes along the parting line by the flacer.

To provide long timber and long framing lumber capability, a long timber cutoff means and long log bebarker section are added to station A; a quick coupled trailer log carriage, control means for positioning of log and carriages with respect to a log end line; means for trimming to the parting line of lumber portions to programmed lumber length and means for distribution of long timber or framing lumber to a product line are added to station B.

For the parting of clear cants to clear lumber and of wide boards to narrow boards, a parting means is added after the flacer of station C with the parting line on the face line of the flacer together with a distribution means for lumber and timbers flaced and parted at station C.

To provide capability in reducing selected cants flaced selectively to width at station D, at least one and in most cases a plurality of horizontal parting means is added to the outfeed line of station D.

The complete flacer mill is capable of producing bark, thick or thin flakes by exchange of cutterheads, chips by use of chipping and surfacing heads and the full range of selected rectangular timber and lumber products from adequate roundwood.

In a new flacer based wood industry, the old division of logs to lumber, plywood and pulp must, of course, be discarded. Instead of the old classification, logs in the flacer mill as used hereinafter are classified to clear, common or flake logs as follows:

*Clear log.*—Generally the lower part of a large tree; contains flake wood in the rounded, tapered and defective portions, clear wood (relatively free of knots) dimensionally and otherwise suited for rectangular clear number and common wood (knotty) dimensionally and otherwise suited for common rectangular timbers and lumber;

*Common log.*—Generally a mid section of a mature tree or the lower section of a smaller tree; contains flake wood in rounded, tapered and defective portions and common wood dimensionally and otherwise suited for common timbers and lumber;

*Flake log.*—Generally the upper section of a large tree or an entire small tree; contains wood dimensionally and otherwise suited only for chips or flakes. Thinnings and the like 4 to 8 inches in diameter are flake logs. The knots generally are not large enough in small thinnings to require flacing on the four sides to reduce the size of the knot to such a size to permit flacing along the axis of a knot.

Thick flakes may be more uniform than chips, but are used in the same secondary processes and have about the same utility and value as conventional chips.

Thin flakes, however, have new utility in flacer plywood and as a new raw material for new chemical processing and therefore are of higher value than thick flakes or chips.

The relative values of the primary products of a flacer mill of the present invention are:

| Primary product: | Relative value |
|---|---|
| Clear lumber | 10 and up |
| Shop or factory | 3–10 and up |
| Common timbers and lumber | 3–10 |
| Thin flakes | 0–8 |
| Thick flakes and chips | 0–3 |
| Bark | 0–1 |
| Cutoff, trim and hog material | 0–1 |
| Parting material | 0–1 |

Applicant has discovered that partially decayed wood is readily cut into useable flakes while fully decayed wood is not strong enough to support itself during flacing so that it and any loose material on the surface of a log are simply brushed aside by the flacer.

Also, applicant has discovered that, in general, a deviation from parallel of the cutting edges with the grain of the wood of about 30 degrees is satisfactory. Stated simply the width of face to be flaced should not exceed half the diameter of the face of the flacer. This objective is realized in the process and apparatus of the present invention.

The squaring of a log or the breakdown by turning as on a log carriage results in desired cutting of a knot generally across the axis of a knot producing both quality flakes and surfaces.

Automation is generally desired in any new process. Full automation requires mechanization, continuous processing and feedback control. However, each log is unique and individual. The selective breakdown of a tree or log to flakes and rectangular lumber products may be mechanized, but is only a continuous selection of batch operations and is not subject to feedback control.

The selective breakdown of logs to flakes and lumber products, while involving flacing and parting, is also a grading operation. The grading of logs, lumber and timbers is done by visual inspection. Visual inspection must be used for decisions of where to flace and part logs to flakes and rectangular wood products.

Therefore, a new process for the selective primary breakdown of roundwood is not subject to automation. It must instead be controlled by a skilled man aided by mechanization, step processing and programming of the work to be performed.

High yield flacer mills will eliminate burners and steam power plants formerly used for power generation. Purchased utility power is generally available everywhere and is less costly on a 24 hour steady demand basis. A 24 hour operation is smaller, lower in capital cost and less costly to operate for a steady annual production.

Thin flakes, as a raw material, lend themselves to automated secondary processing. Thin flakes are not, as a practical matter, storable nor transportable, but must be produced and processed on a continuous basis. Acceptable processes are available for integrated dry secondary processing of thin flakes to flacer plywood, strand oriented board and the like.

Thick flakes or chips are transportable and storable. However, transport and storage are costly and useless. It is best to eliminate them entirely. This may be accomplished in the case of dry and semi-dry chip based mechanical pulp processes integrated with the flacer mill. When transport of thick flakes or chips to chemical pulp mills is necessary, it is less costly on a steady scheduled basis.

Rough green timbers and lumber are the raw material for a batch secondary processing. Timbers and lumber produced as a recessive product by the flacer mill at varying rates dependent on logs and demand may be stored, accumulated and unstored for sequence batch processing.

The process and apparatus of the present invention ends the primary division of the industry since all roundwood may be brought to the flacer mill and selectively reduced to desired flakes for flacer plywood, for new chemical and thermal processing, for conventional pulping and to selected rectangular timber and lumber products.

The new flacer mill has a nominal capacity of 50,000 tons of 4 to 8 inch thinnings per year and 50,000 M board feet log scale of 8 inch diameter and larger roundwood. The mill is preferably located within a tree farm area for economical collection of roundwood. On a sustained yield basis, an average haul distance of 10 to 20 miles is generally attainable. Thinnings and the like are delivered by light equipment while 8 inch and larger roundwood is delivered in tree length, maximum truck length or the largest sizes practicable reducing labor and equipment in the woods to a minimum. The mill is designed for continuous operation for economies in cost of purchased power, capital, labor, for elimination of in-process inventory, benefits of continuous secondary processing and other factors. Secondary processing of primary products is preferably integrated with the flacer mill except for chemical pulp. Thick flakes produced by the flacer mill are transportable to the chemical pulp mill usually located with respect to water supply and effluent disposal factors.

All sawdust from outside cuts, the slabs, edgings, tapers, thins and trims, waste veneer and cores formerly produced are now reduced to desired flakes in the first instance. Wood formerly sorted out and classed as pulpwood may now be brought with other roundwood to the flacer mill for reduction to flakes selectively recovering any rectangular lumber products. Roundwood, thinnings and the like formerly useable only for chips may now be converted to thin flakes having new utility and value. Labor and equipment formerly required to sort, convey and dispose of waste products are eliminated.

A yield in useful and high value saleable products in excess of 90 percent is attainable. An operator can now produce flacer plywood and lumber or thick flakes and lumber. He can double the return from the forest in many cases and realize substantial savings in labor, transportation and equipment costs. He can pay more to the tree farmer.

The new process and flacer mill is universally useful may be standardized and mass produced in a few sizes such that benefits of quality, interchangeability of parts and low cost inherent in mass production may be realized and made available to the wood industry. The new mill is capable of supplanting and rendering obsolete known and existing sawmills, structural veneer mills and chip mills thereby ending the present wasteful and costly division of the industry into three primary divisions each competing with the other for logs and markets. Thinnings and cull trees formerly unmarketable, may now be profitably utilized.

BRIEF DESCRIPTION OF THE DRAWINGS

FIG. 7 is a plan view of station B of the flacer mill with the addition of a vertical parting means (band saw) following the flacer.

FIG. 11 is a sectional elevation 11 of FIG. 7 showing the vertical parting means added to station B.

DESCRIPTION OF THE PREFERRED EMBODIMENTS

The process steps to be followed in each of the five stages of development of the flacer mill for the primary breakdown of roundwood generally from 8 inch butt diameter and larger are fully illustrated and described in FIGS. 1 through 5.

The operating floor of the new flacer mill shown in FIGS. 6 through 10 is preferably 8 to 12 feet above ground level. On the ground floor (not shown) are conventional bark conveyor; cutoff, hog and trim conveyor, parting material exhauster duct, hydraulic, electrical and other accessory equipment.

Conventional equipment on the operating floor used in combination with new equipment mainly to convey, cutoff, debark, load, trim, turn, part, unload and distribute is defined as follows:

*Conveyor.*—A traveling belt, chain, concave or cylindrical roll device usually driven by an electric motor through a gear box and roller chain drive for longitudinal movement of logs, cants, timbers and boards;

*Cutoff means.*—A chain, circular or reciprocating saw or other suitable means;

*Transfer.*—Multiple parallel traveling chains or belts usually driven by an electric motor through a gear box and line shaft for transverse movement of logs, cants, timbers and lumber;

*Ejector.*—Pusher arms and other conventional devices usually actuated by an air or hydraulic cylinder for ejecting a log or cant from a conveyor;

*Log loader and turner.*—Conventional devices at the loading position of a log carriage for feeding of one log at a time, loading and turning of logs, cants and boards on or against the knees of a log carriage;

*Log carriage.*—A rail mounted carriage generally running on one V and one flat rail, usually propelled by a direct current motor with speed control through a cable, drum and sheave combination, with two or more knees and means for holding logs, cants and boards of varying sizes and shapes while flacing and parting; the positioning and holding of the log, travel and position of the carriage remotely controlled by the operator.

*Trim and parting means.*—Laser beam, hydraulic jet, conventional chain, band, circular or reciprocating saw, knife or any other suitable means;

*Controls.*—Electrical starters, breakers, relays, interlocks, selector switches, push buttons and other standard items of electrical gear normally selected and wired by any competent electrical engineer to perform the manual, sequence and memory steps outlined.

Figures 6, 8, 9, 10, 12, 13, 14:
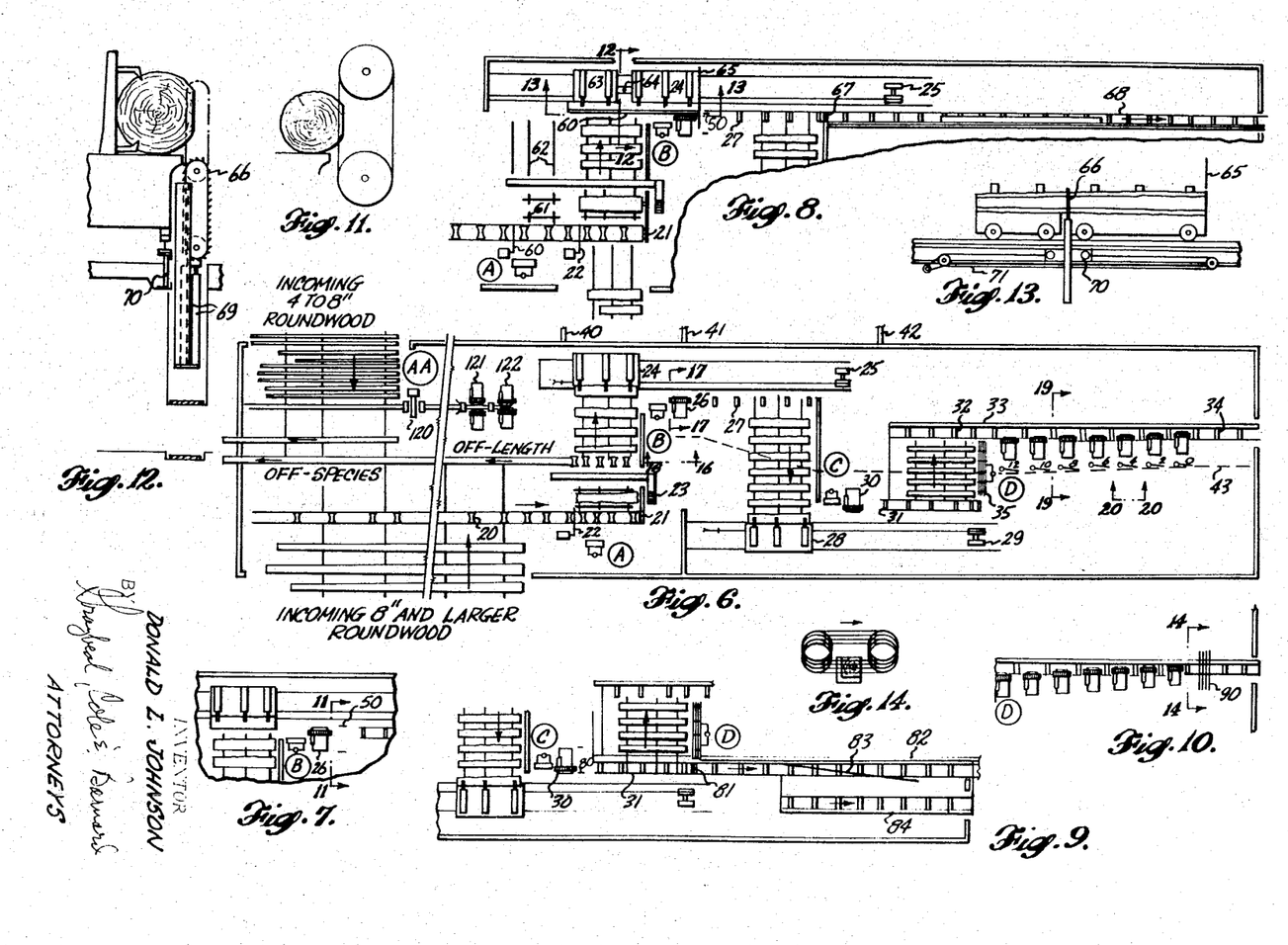
FIG. 6 is a plan view of the operating floor of the basic flacer mill comprising breakdown station AA for thinnings and stations A, B, C and D for 8 inch diameter and larger roundwood.
FIG. 8 is a plan view of stations A and B of the flacer mill showing the addition of long timber cutoff means and long log debarker means to station A; trailer carriage, vertical trimmer, long timber distribution means and product line to station B.
FIG. 9 is a plan view of station C of the flacer mill with addition of vertical parting means (band saw) following the flacer, clear lumber and timber distribution means and product line.
FIG. 10 is a plan view of station D of the flacer mill with addition of a plurality of horizontal parting means (band saws) for parting of rectangular timbers to lumber of programmed thickness.
FIG. 12 is a sectional elevational view 12 of FIG. 8 showing the vertical trimmer at station B trimming the lumber portion of a log mounted on the carriage to the parting line.
FIG. 13 is a sectional view 13 showing the flaced log on the carriage with the lumber portion being trimmed to the parting line at programmed length from the end of the log and a fixed log end line.
FIG. 14 is a sectional elevational view 14 of FIG. 10 showing a plurality of horizontal parting means (band saws) for parting of timbers at station D to programmed thickness lumber.

Referring now to FIG. 6, the four breakdown stations comprising the basic flacer mill are shown under control of operators A, B, C and D. Roundwood of like or compatible species, generally 8 inches in diameter and larger, is delivered in random size to incoming roundwood deck by log transfer, log lift truck or other means not shown with butt ends toward station A. Presumably, all roundwood is of like or compatible species, but mistakes do occur and sometimes it is necessary to include off-species in a load. Any off-species roundwood is ejected by operator A to off-species conveyor for delivery to storage and use when this species is being processed.

Station A comprises incoming conveyor 20, end stop 21, log cutoff means 22 movable along conveyor with respect to end stop 21 for cutoff of roundwood to programmed log length; a rotating log type debarker and debarking head 23 arranged to travel over the log as it is rotating removing the bark as it travels the length of the log and an off-length log conveyor together with necessary ejectors, manual and sequence controls under operator A.

Station B comprises incoming log transfer, log carriage 24, carriage drive 25, flacer and drive 26 and off-bear rolls 27, all under control of operator B.

Station C comprises incoming log and cant transfer, log carriage 28, carriage drive 29, flacer 30 and off-bear rolls 31 all under control of operator C.

Station D comprises cant and board incoming transfer, angled infeed rolls 32, vertical feeding wall 33, the succession of flacers each spaced a nominal incremental stage of 2 inches nearer to the vertical feeding wall with the final flacer merely clearing the wall, outfeed rolls 34, pushbutton selector chains 35 together with memory and other necessary controls all under operator D.

Optional hogging cutters for combined hogging of limbs, flares and other protuberances and flacing are used at stations B, C and on the first of the success of flacers at D, but not on those following since they are unnecessary.

A computer operates on the principle of many 1 or 0, on or off, in or out decisions. This principle is utilized in the vertical positioner of the flacer drive. With the vertical positioner, the flacer is either in or out, referred to hereafter as in-position or out-position, of the flacing area. The positioner also provides for variations in diameter of logs and to expose the face of the heads for exchange of cutterheads.

A small monorail crane system (not shown) preferably is used for exchange of flacer heads.

Lugged transfer chains on the infeed transfer to stations C and D space the flaced logs and cants uniformly on the transfers.

At stations B and C, the flacers are normally at in position, but adjustable vertically by the operator for variations in log diameter or size of cant or board. At station D, all flacers are normally at in-position. The first of the seven successive flacers will flace a cant to nominal 12 inch width. Each succeeding flacer will flace to 10, 8, 6, 4, 2 and 0 inch width respectively.

An over-riding hold down roll (not shown) may be used at each flacer to hold the cant down firmly on the feed rolls. A conventional "pineapple" feed roll may be used at the infeed point to assure quick acceleration of the cant to proper infeed speed. The longitudinal component of the angled infeed rolls provides the proper infeed velocity while the horizontal component holds the cant against the feeding wall while feeding longitudinally to the succession of flacers.

While lumber is nominally sized in multiples of one inch in thickness and two inches in width, the commercial sizes are such that multiples of thickness do not equal multiples of width. The flacers of station D, therefore, can be set up to flace cants and boards to width only. All cants and boards have to be sized to thickness at stations B or C followed by flacing selectively to width at station D. All cants and boards have to be fed with the flat or width side down on the feeding rolls and with a flat side against the feeding wall.

It is to be noted that each cant discharged from station B and from station C is discharged with the flaced side forward and in proper position without turning to be flaced at the next succeeding station.

Figure 19:
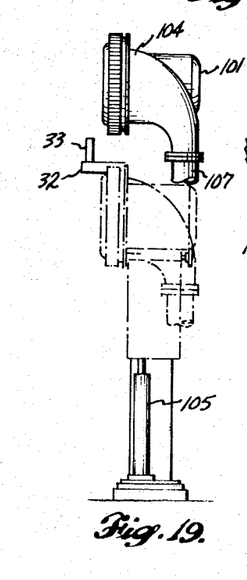
FIG. 19 is a sectional elevational view 19 of FIG. 6 showing the infeed side of the flacer drive at station D.
Figure 20:
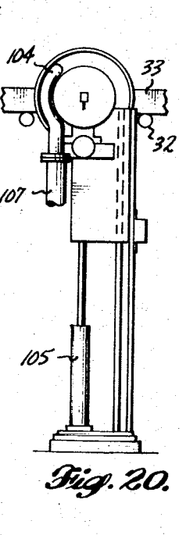
FIG. 20 is a sectional elevational view 20 showing a side view of a flacer at station D.

As shown in FIGS. 19 and 20, the flacers at station D drop out of the flacing area selectively for flacing to width. If an 8 inch width is to be flaced, flacers 6, 4, 2 and 0 inch drop out of flacing position—as a typical example.

A memory control system is needed at station D. For lumber, maximum width of 12 inches is standard. Normally, all flacers are at in-position for reduction of flake cants to desired flakes. For selective flacing of lumber cants to width, six selections are required as follows:

| Lumber width, inches: | Flacers at out-position, inches |
|---|---|
| 12 | 10, 8, 6, 4, 2, 0 |
| 10 | 8, 6, 4, 2, 0 |
| 8 | 6, 4, 2, 0 |
| 6 | 4, 2, 0 |
| 4 | 2, 0 |
| 2 | 0 |

A simple system is to install six chains 35, FIG. 6, of the same pitch as the transfer chains, traveling with the transfer chains in front of operator D, each with a mechanical push button opposite the cant on the lugged transfer chains. Operator D inspects each cant. If no button is pushed, the cant is reduced to desired flakes. Pushing button 12 inch drops out flacers 10 inch and all of the following succession of flacers when the cant or board is delivered to the infeed rolls. Pushing button 6 inch drops out flacers 4, 2 and 0 inch and so on. As the push button in the chain arrives with its cant or board at the infeed rolls, it trips an electrical switch which through electrical controls actuates the hydraulic positioners dropping the proper flacers out of in-position. The transfer chain speed is such that the programmed length of the preceding piece clears the succession of flacers before the next cant or board arrives at the infeed rolls. As each piece clears, the flacers return to in-position.

Figure 1:
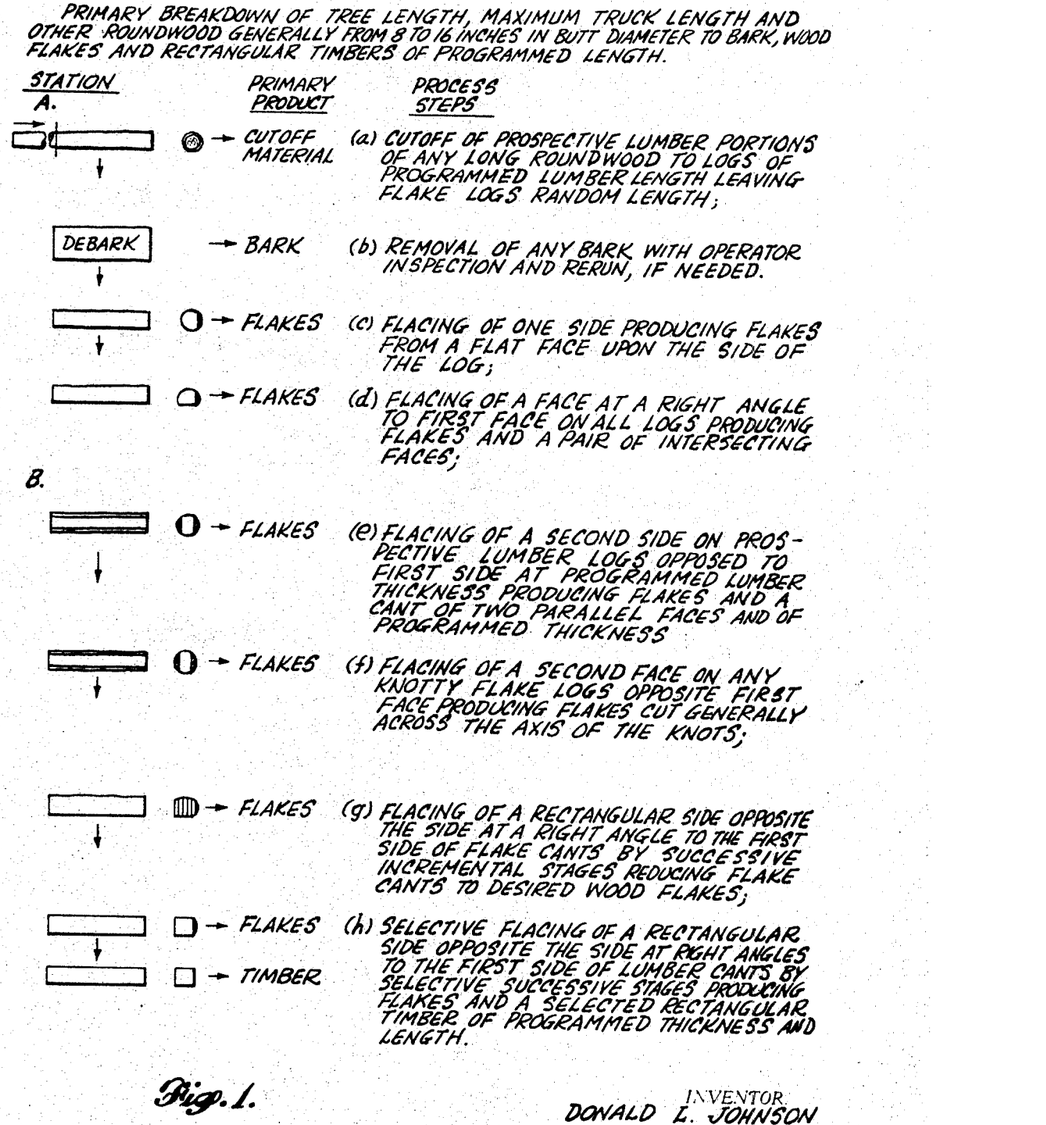
FIG. 1 is a step by step process chart for the primary breakdown of tree length, maximum truck length and other roundwood, generally from 8 to 24 inches in butt diameter, to bark, wood flakes and rectangular timbers of programmed length.

The process steps of FIG. 1 are for the breakdown of long roundwood, generally from 8 to 24 inches in diameter, to any bark, to wood flakes and selectively to wood flakes and rectangular timbers of programmed length employing the basic flacer mill of FIG. 6.

Figure 2:
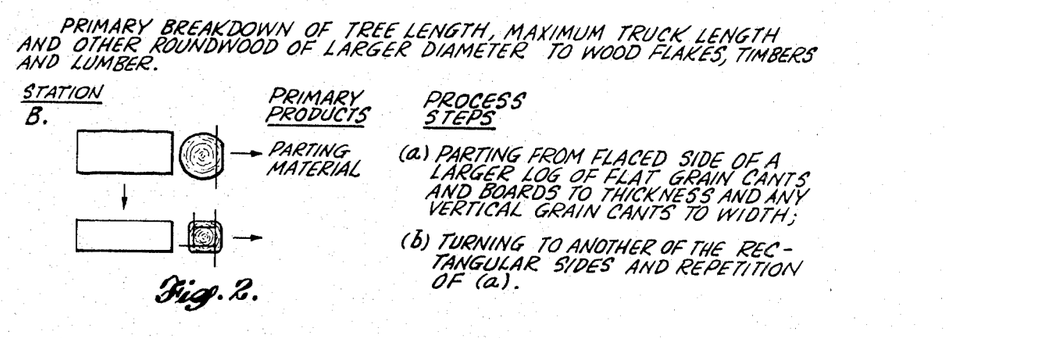
FIG. 2 is a chart of additional steps necessary in the breakdown of larger logs to wood flakes, cants and boards.

Capability for the breakdown of logs generally over 16 inches in diameter to cants and boards is provided in the additional process steps of FIG. 2 and in the flacer mill by addition of a parting means, in this case a band saw 50, to station B of FIG. 7 directly after the flacer 26 and with the parting line on the face line of the flacer. An elevational view of the parting means 50 is shown in FIG. 11.

Figure 3:
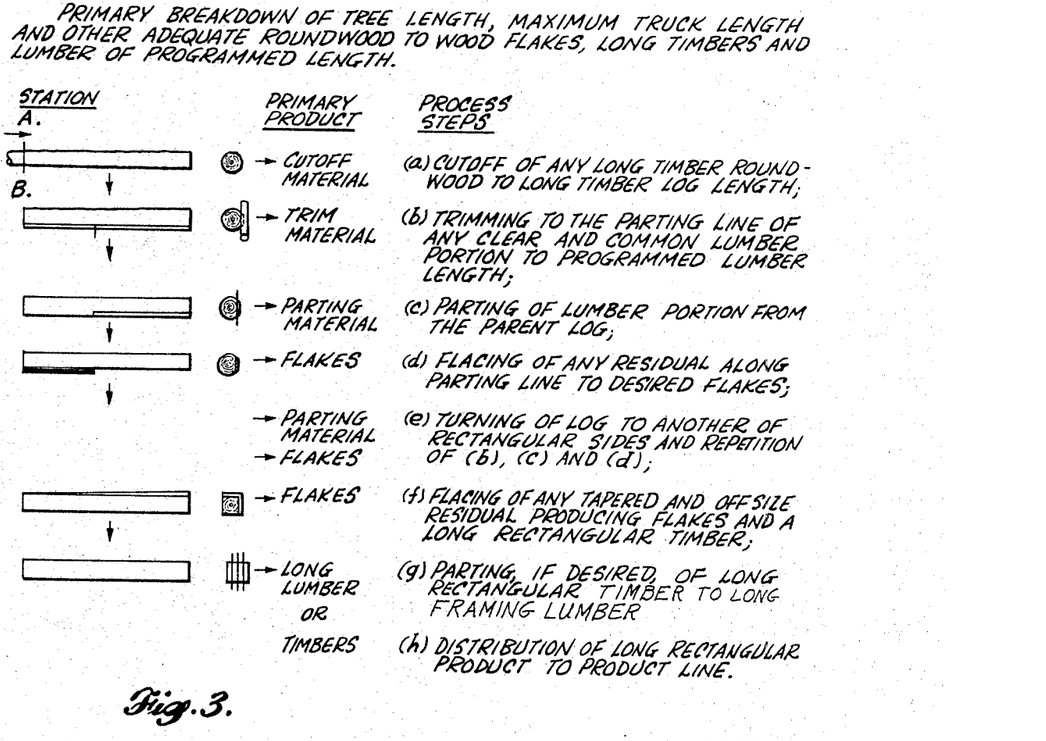
FIG. 3 is a chart of additional steps necessary in the breakdown of long timber logs to long timbers and lumber of programmed length and in the distribution of long timbers.

Capability for the production of long timbers from adequate roundwood is provided in the process steps of FIG. 3 and in the flacer mill by the further addition, as shown in FIG. 8 of long roundwood cutoff means 60 adjustable with respect to log end stop 21, long timber log debarker section 61, extra log transfer chains 62, trailer log carriage 63 with quick coupling to main carriage 24 under control of operator B, fixed log end line 65, vertical trim means 66, positionable along carriage rail beam with respect to log end line 65 for parting of lumber portions of long timber log to programmed lumber length, a vertically introduceable and removeable "stop" means 67 in off-bear roll conveyor 27 and long timber product line roll conveyor 68.

FIG. 12 further illustrates the "trimmer" of the present invention employing chain saw 66 powered by an electric motor preferably, mounted on a vertical slide and introduceable horizontally and vertically for trimming of the lumber portion of a flaced or parted log, set out on the carriage, to the parting line by means of an hydraulic cylinder 69 or other suitable means. In FIG. 13, the slide support 70 is shown mounted on suitable ways on the track beam positionable with respect to log end line 65 by means of powered drum and cable system 71 under control of operator B.

In the case of very long timbers, a second trimmer may be added adjustable in position by operator B a programmed lumber length from the first trimmer shown such that the long lumber portions may be trimmed to two pieces of lumber of programmed lumber length.

Figure 4:
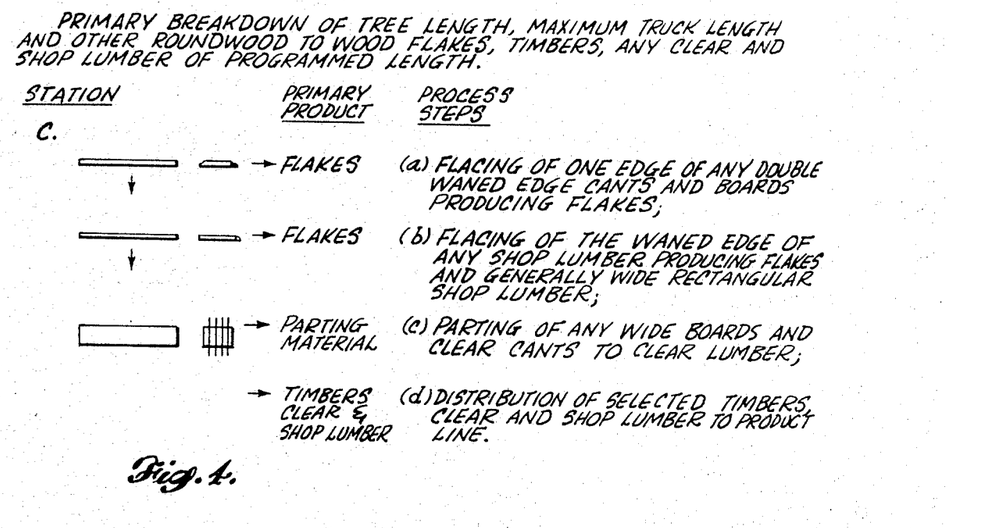
FIG. 4 is a chart of additional process steps necessary in the breakdown of wide boards and clear cants to lumber and distribution to a lumber and timber product line.

Capability for the production of clear boards from clear cants, wide factory and shop lumber and short timbers is provided in process steps of FIG. 4 and is carried out in the flacer mill by addition of a vertical parting means 80, also a band saw, to station C of FIG. 9 mounted after the flacer and with the parting line on the face line of flacer 30; a vertically introduceable and removeable "stop" means 81 in off-bear roll conveyor 31 under control of operator C; clear and shop lumber product line 82; timber shear 83 and timber product line 84. The shear 83 allows clear and shop lumber to go under in on roll conveyor and product line 82 while timbers are "sheared" off onto roll conveyor and product line 84.

Figure 5:
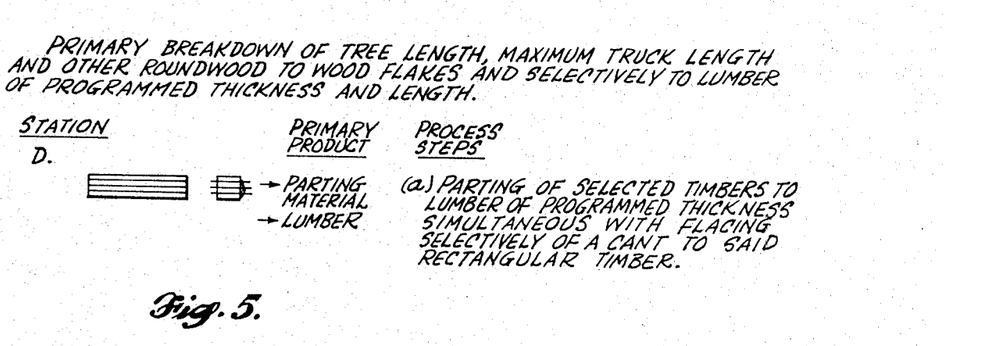
FIG. 5 is a chart of additional steps necessary in the reduction of selected cants to lumber of programmed thickness simultaneous with flacing to a rectangular timber.

Capability for the programmed parting of cants selectively flaced to width to common lumber of programmed thickness is provided in additional process steps of FIG. 5 and in the flacer mill by addition of at least one horizontal parting means 90 to the outfeed roll conveyor of station D as shown in FIG. 10. In this case, band saw parting means are added further illustrated in elevational view of FIG. 14.

Figure 15:
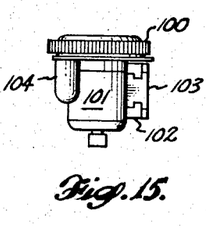
FIG. 15 is a plan view of the flacer drive, flake collector and slide for the vertical positioner.

In FIG. 15, flacer head assembly 100 is shown mounted on drive motor 101 mounted in turn on the vertical positioner 102, slideably supported on slide support 103. Flake collector hood 104 is mounted integral with the motor frame and mates with discharge side of closure head assembly of the flacer of my companion application when this cutterhead assembly is used.

Figure 16:
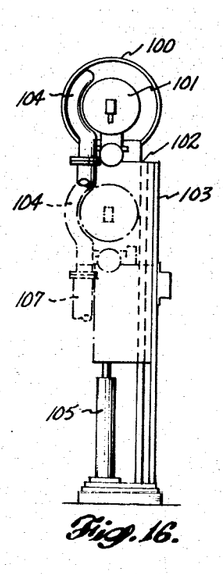
FIG. 16 is a sectional elevational view 16 of FIG. 6 showing the flacer drive, the flake collector, vertical slide and positioning means.

FIG. 16 shows the flacer drive at in-position and at out-position for stations B and C. These stations are basically the same except opposite hand. The flacer head 100 is shown on drive motor 101 supported by slide 102 slideably supported on slide support 103. An hydraulic cylinder 105 provides actuating means for the vertical positioning.

A counter balance (not shown) may be added to the positioner counter acting a portion of the weight of the flacer, drive and slide support reducing the power required for quick vertical positioning of the flacer.

Figure 17:
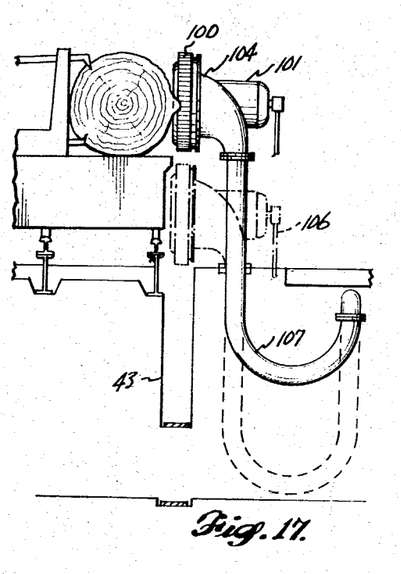
FIG. 17 is a sectional elevational view 17 of FIG. 6 showing the log on the carriage, the flacer and drive, the flake collector and flexible exhauster hose, the vertical slide, the positioner and the hogged material conveyor.

In FIG. 17, the flacer is shown at in-position and at out-position with respect to a log mounted on a log carriage. A pressurized fluid hose 106 supplies air or other fluid under pressure to the flacer head assembly. A flexible hose 107 is shown to serve as a flexible conduit for the wood flakes from the flake collector and deceleration chamber 104 to the flake exhauster duct. A telescoping duct or the means for providing vertical postioning of the flacer and for collection of the flakes may also be used. Any limbs or other protuberances hogged from the side of the log fall into hogged material conveyor 43.

Figure 18:
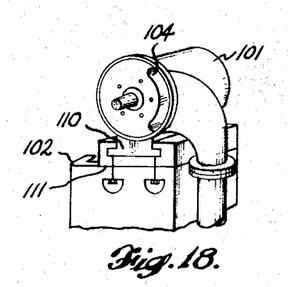
FIG. 18 is an isometric view of the flake collector flange mounted on the flacer drive motor, the face angle clearance adjustment and the face position adjustment.

Isometric view of flacer drive, FIG. 18, shows the closure plate and flake collector 104 mounted on flacer drive motor 101. A conventional machine slide 110 provides for adjustment of face position of the flacer. A flat horizontal surface 111 on the top of the vertical positioner provides for adjustment of face clearance angle. Preferably, the face clearance angle is rotatable about an axis directly opposite the flacing area such that a change in face clearance angle does not change the face position. Suitable bolts 112 lock the drive in proper position. If a telescoping flake duct is used, another telescoping joint should be provided between the flake collector flange and the deceleration chamber such that adjustment for face position may be made without disturbing the alignment of the telescoping vertical duct.

In FIGS. 19 and 20 the flacer drive is shown in relation to the infeed rolls 32, the vertical feeding wall 33 and at both in-position and out-position for station D.

At station AA, in FIG. 6, small 4 to 8 inch thinnings and the like are debarked using a rotating ring debarker 120 and reduced to flakes by a succession of two pairs of opposed flacers 121 and 122. The first pair employs hogging cutters to hog any material in excess of 8 inches. A vertical positioner, preferably standardized and mass produced with face angle and position adjustment, is used for each flacer drive and for exposing the heads for exchange of cutterheads.

Referring again to FIG. 6, bark is delivered from the mill in ground floor conveyor 40; cutoff, hog and trim material in conveyor 41; parting material in exhauster duct 42 and flakes in exhauster duct 43 all located below the operating floor.

In a typical operation, 4 to 8 inch roundwood is delivered to incoming deck of station AA by light equipment while 8 inch and larger roundwood is delivered by heavier equipment with butt end towards station A to incoming deck of station A. Any off-species roundwood is ejected to off-species conveyor by operator AA and by operator A for delivery to storage and processing at another time.

Preferably, the flacer mill is operated as a product mill. Stations AA and stations A, B, C and D are operated cooperatively to produce the desired steady production per hour of flakes for integrated secondary processing or for scheduled transport to conventional pulp mills. A lumber program may call for one length of lumber at one time and one thickness of clear or shop and another thickness of common lumber from adequate roundwood with all multiples of width to recover the greatest yield in lumber product when desired. A long timber may be produced at any time an adequate log is delivered and the product is desired. Sorting of roundwood for size, except for what normally takes place in harvesting, is eliminated. In many cases, a single size of lumber product may be produced at one time, depending on log supply and markets, eliminating sorting of lumber product for size entirely. Off-length logs may be distributed to off-length conveyor by operator A for delivery to storage for use at another time when this length of log is being processed.

A flacer mill for lumber up to 20 feet in length is considered by applicant to be the best and most universally useful size. Long timber and framing lumber capability may be provided to most any practical length. In areas where smaller timber prevails, shorter mills may be desired.

Bolts for decorative veneer may be cut from a log, debarked and delivered from the mill using the off-length and off-species conveyor. Logs of one species and length accumulated in storage may be returned to the mill for processing using the same conveyor.

There is much flexibility in the new flacer mill. The cutterheads may be quickly exchanged for replacement or change of flake size. The product may be all flakes or flakes and selected timber and lumber products. The programmed lumber size may be changed at any time. Lumber will be more accurately sized and smoother of surface than heretofore improving yield, kiln drying and reducing loss in shavings from secondary operations.

At station D, the final flacer in the succession may be installed opposite hand and opposed to the preceding flacer reducing the space required for the succession. In cases where no lumber less than 4 inch nominal width is to be produced, the 2 inch flacer could be installed opposite the 4 inch and the final flacer in the succession opposite the 6 inch providing for better flaking of small logs having only one flat feeding face and further reducing space requirements. Other modifications could also be made without departing from the spirit and essence of the present invention.

The above, in the belief of the applicant, is a full and complete disclosure of the present unique process and apparatus invention providing a high yield, universally useful, process and flacer mill which may be standardized and mass produced in a few sizes for quality, interchangeability of parts and low cost—a full solution to the many problems outlined—together with other incidental and important advantages.

I claim:

1. In the primary breakdown of debarked logs to wood flakes, the process steps of:
   (a) flacing of one side of the log producing flakes from and flat face upon the side of the log;
   (b) feeding of flaced log on said flat face simultaneous with flacing by successive incremental stages reducing said flaced log to desired wood flakes.

2. In the primary breakdown of debarked logs to wood flakes, the process steps of:
   (a) flacing of one side of the log producing flakes from and a flat face upon the side of the log;
   (b) flacing of a side opposite said flat face on any knotty flake logs producing flakes cut generally across the axis of the knots;
   (c) feeding of flaced log on said flat face simultaneous with flacing by successive incremental stages reducing said flaced log to desired wood flakes.

3. In the primary breakdown of debarked logs to wood flakes, the process steps of:
   (a) flacing of one side of the log producing flakes from and a flat face upon the side of the log;
   (b) flacing of an adjoining rectangular side producing flakes and a cant having a pair of adjoining rectangular faces;
   (c) feeding of cant on said pair of adjoining faces simultaneous with flacing by successive incremental stages reducing said cant to desired wood flakes.

4. In the primary breakdown of debarked logs of wood flakes, the process steps of:
   (a) flacing of one side of the log producing flakes from and a flat face upon the side of the log;
   (b) flacing of an adjoining rectangular side producing flakes and a cant having a pair of adjoining faces;
   (c) flacing of a third rectangular side on any knotty flake log producing flakes cut generally across the axis of the knots;
   (d) feeding of a cant on said pair of adjoining faces simultaneous with flacing by successive incremental stages reducing said cant to desired wood flakes.

5. In the primary breakdown of debarked logs to wood flakes, the process steps of:
   (a) parting of a log to cants of manageable thickness;
   (b) flacing of one edge of any double waned edge cants producing flakes and a cant having one rectangular edge;
   (c) parting of any overwide cants to cants of manageable width;
   (d) feeding of said cants on a pair of adjoining faces simultaneous with flacing by successive incremental stages reducing said cants to desired wood flakes.

6. In the primary breakdown of debarked logs selectively to wood flakes and rectangular lumber products, the process steps of:
   (a) flacing of one side of the wood log producing flakes from and a flat face upon the side of the log;
   (b) flacing of an adjoining rectangular side producing flakes from and a pair of adjoining rectangular sides on the log;
   (c) flacing of another rectangular side opposite the first side producing flakes and a cant of programmed thickness;
   (d) feeding of cant on said pair of adjoining rectangular sides simultaneous with flacing of the fourth rectangular side by selective successive incremental stages producing flakes and rectangular lumber products of programmed thickness and width.

7. The process steps of claim 6 and including:
   (a) parting of a selected rectangular timber to lumber thickness in line with selective flacing of a cant to said rectangular timber.

8. In the primary breakdown of debarked logs selectively to wood flakes and rectangular lumber products, the process steps of:
   (a) flacing of one side of the wood log producing flakes from and a flat face upon the side of the log;
   (b) parting from the flaced side of the log of flat grain cants or boards to thickness;

(c) flacing of any double waned edge cant or board producing flakes and a cant or board having one adjoining flat edge;

(d) feeding of a cant or board on said pair of adjoining sides simultaneous with flacing of the fourth rectangular side by successive selective incremental stages producing flakes and rectangular timbers or lumber of programmed thickness and width.

9. In the primary breakdown of debarked logs selectively to wood flakes and rectangular lumber products, the process steps of:

(a) flacing of one side of the wood log producing flakes from and a flat face upon the side of the log;

(b) parting of a log to desired cants and boards;

(c) flacing of one edge of any double waned edge cants and boards producing flakes and a cant or board having one rectangular edge;

(d) flacing of opposite edge of any cants and boards producing flakes and rectangular lumber products.

10. The process steps of claim 9 including distribution of selected shop or clear lumber separately from other products.

11. In the primary breakdown of debarked logs selectively to wood flakes and rectangular lumber products, the processing steps of claim 6 and including:

(a) parting from flaced side of any flat grain boards to thickness and any vertical grain cants to width;

(b) turning to another of the rectangular sides and repetition of (a) and (b);

(c) flacing of any tapered or off-size center portion producing flakes and a rectangular timber.

12. The process steps of claim 11 and including:

(a) parting of any cants to lumber;

(b) distribution of any clear lumber and selected timbers separately from other products.

13. In the primary breakdown of debarked logs selectively to wood flakes and rectangular lumber products, the process steps of:

(a) flacing of one side of the wood log producing flakes from and a flat face upon the side of the log;

(b) trimming of a lumber portion from a flake portion to the parting line;

(c) parting of said lumber portion from the parent log;

(d) flacing of said flake portion to the line of the parting line producing flakes and a continuous flat face on the log or cant.

14. The process steps of claim 13 and including:

(a) the flacing of any long tapered or off-size center portion producing flakes and a long rectangular timber;

(b) distribution of said long timber to a long timber product line.

15. In the primary breakdown of debarked logs to wood flakes and selectively to wood flakes and rectangular lumber products, the process steps of:

(a) flacing of one side of the wood log producing flakes from and a flat face upon the side of the log;

(b) flacing of an adjoining rectangular side producing flakes from and a cant having a pair of adjoining rectangular side;

(c) flacing of a face opposite the first face on any prospective lumber logs to programmed lumber thickness producing flakes and a cant of two parallel faces and of programmed thickness;

(d) flacing of a face opposite the first face on any knotty flake logs generally following the taper of the log producing flakes cut generally across the axis of the knots;

(e) flacing of a rectangular side opposite the side at a right angle to the first side of flake cants by successive incremental stages reducing flake cants to desired wood flakes;

(f) flacing of a rectangular side opposite the side at a right angle to the first side of any lumber cants by selective successive incremental stages producing flakes and selected rectangular lumber products.

16. In the primary breakdown of tree length, maximum truck length and other roundwood to bark, to wood flakes and selectively to wood flakes and rectangular lumber products, the process steps of:

(a) cutoff of prospective lumber portions of any long roundwood to logs of programmed lumber length leaving flake portions random length;

(b) debarking of the log;

(c) flacing of one side of the wood log producing flakes from and a flat face upon the side of the log;

(d) flacing of a face at a right angle to first face producing flakes and a pair of adjoining rectangular faces;

(e) flacing of a side opposite the first face on prospective lumber logs at programmed lumber thickness producing flakes and a cant of two parallel faces and of programmed thickness;

(f) flacing of a side opposite the first face on any knotty flake logs producing flakes cut generally across the axis of the knots;

(g) flacing of a rectangular side opposite the side at a right angle to the first side of flake cants by successive incremental stages reducing flake cants to desired wood flakes;

(h) flacing of a fourth rectangular side of lumber cants by selective successive incremental stages producing flakes and selected rectangular lumber products of programmed length.

17. In the primary breakdown of tree length, maximum truck length and other roundwood to wood flakes are rectangular lumber products, the process steps of claim 16 and including:

(a) parting from flaced side of a larger log of flat grain cants and boards to thickness and any vertical grain cants to width;

(b) turning to another of the rectangular sides and repetition of (a);

(c) flacing of any tapered or off-size center portion producing flakes and a rectangular timber.

18. In the primary breakdown of tree length, maximum trunk length and other adequate roundwood to wood flakes, long timbers and lumber of programmed length; the process steps of claim 17 and including:

(a) cutoff of any long timber roundwood to long timber log length;

(b) trimming to the parting line of any flaced lumber portion to programmed lumber length;

(c) parting of lumber portion from the parent log;

(d) flacing of any residual along parting line to desired flakes;

(e) turning to another of the rectangular sides and repetition of (b), (c) and (d);

(f) flacing of any tapered or off-size residual producing flakes and a long rectangular timber;

(g) parting, if desired, of long rectangular timber to long framing lumber;

(h) distribution of long rectangular product to a product line.

19. In the primary breakdown of tree length, maximum truck length and other roundwood to wood flakes, any clear or shop lumber of programmed length, the process steps of claim 17 and including:

(a) flacing of one edge of any double waned edge cants and boards producing flakes;

(b) flacing of the waned edge of any shop lumber producing flakes and generally wide rectangular shop lumber;

(c) parting of any wide boards and clear cants to clear lumber;

(d) distribution of selected timbers, clear and shop lumber to product line.

20. In the primary breakdown of tree length, maximum truck length and other roundwood to wood flakes and selectively to lumber of programmed thickness and length, the process steps of claim 16 and including:
  (a) parting of a selected rectangular timber to common lumber of programmed thickness simultaneous with flacing selectively of a cant to said rectangular timber.

References Cited

UNITED STATES PATENTS 3,304,971   2/1967   Pease _____________ 144—326

GERALD A. DOST, Primary Examiner

U.S. Cl. X.R.

144—176